(12) United States Patent
Wittmann et al.

(10) Patent No.: US 8,516,841 B2
(45) Date of Patent: Aug. 27, 2013

(54) HEATING AND AIR CONDITIONING UNIT FOR AN AUTOMOTIVE VEHICLE

(75) Inventors: Klaus Wittmann, Coburg (DE); Daniel Neveu, Massy (FR); Jean Luc Thuez, Fourqueux (FR); Didier Barat, Les Essarts le Roi (FR)

(73) Assignee: Valeo Systems Thermiques, Le Mesnil Saint Denis Cedex (FR)

( * ) Notice: Subject to any disclaimer, the term of this patent is extended or adjusted under 35 U.S.C. 154(b) by 1081 days.

(21) Appl. No.: 12/425,621

(22) Filed: Apr. 17, 2009

(65) Prior Publication Data

US 2009/0260386 A1    Oct. 22, 2009

(30) Foreign Application Priority Data

Apr. 18, 2008 (EP) .................................. 08154770

(51) Int. Cl.
*B60H 1/32* (2006.01)

(52) U.S. Cl.
USPC .................. 62/244; 62/159; 62/160; 62/239; 62/324.1; 62/324.6; 165/41; 165/42

(58) Field of Classification Search
USPC ............. 62/159, 160, 239, 244, 324.1, 324.6, 62/439, 198, 519; 165/41, 42
See application file for complete search history.

(56) References Cited

U.S. PATENT DOCUMENTS

| | | | | |
|---|---|---|---|---|
| 5,996,365 | A | * | 12/1999 | Tanaka .......................... 62/196.4 |
| 6,112,543 | A | * | 9/2000 | Feuerecker et al. ............. 62/430 |
| 7,412,838 | B2 | * | 8/2008 | Hamanaka et al. ............. 62/115 |
| 2006/0027357 | A1 | * | 2/2006 | McKenzie et al. ............... 165/73 |

* cited by examiner

*Primary Examiner* — Marc E. Norman
*Assistant Examiner* — Jonathan Bradford
(74) *Attorney, Agent, or Firm* — Howard & Howard Attorneys PLLC (57) ABSTRACT

A heating and air conditioning device 20 for an automotive vehicle, including a refrigerant circuit 4 in which a refrigerant circulates between three distinctive units 6, 10, 14 exchanging with respective secondary liquid loops 8, 12, 16. An evaporating unit 6 is dedicated to the evaporation of the refrigerant when operating in a cooling mode. A cooling unit 10 is dedicated to the cooling or condensation of the refrigerant when operating in the cooling mode as well as operating in the heating mode. A reversible unit 14 is dedicated to the evaporation of the refrigerant when operating in the heating mode and dedicated to the cooling or condensation of the refrigerant when operating in the cooling mode.

16 Claims, 7 Drawing Sheets

HEATING AND AIR CONDITIONING UNIT FOR AN AUTOMOTIVE VEHICLE

RELATED APPLICATIONS

This application claims priority to and all the advantages of European Patent Application No. EP 08154770.5, filed on Apr. 18, 2008.

The invention concerns a heating and air conditioning device for an automotive vehicle.

More specifically, it concerns a heating and air conditioning device comprising a refrigerant circuit in which a refrigerant fluid (named hereafter refrigerant) circulates in a single direction in both a cooling mode and in a heating mode, said refrigerant circuit comprising three distinctive units exchanging with respective secondary liquid loop(s).

As technology and automotive market have evolved, the needs for heating and cooling control circuit have greatly risen. As a result, modern heating and air conditioning device have become increasingly complex, both in terms of modularity and features quantity.

This problem has been circumvented by producing devices having a higher power capacity, and which take up more space within the front end of the vehicle and behind the instrument panel.

At the same time, the environmental and efficiency regulations of those systems have dramatically increased. This has led to the use of evermore sophisticated refrigerants, which operate under extreme conditions, along with more sophisticated devices.

Finally, the development of new motor technologies, such as hybrid & electrical cars, introduce new challenges. For example, electrical engines produce less heat than thermal engines. As a consequence, heat is not as readily available for heating purposes in this type of vehicle.

All these factors tend to render traditional heating and air conditioning devices relatively obsolete when considering the modern needs for a heating and air conditioning device which offers high performance in terms of heat control, while consuming lower power than existing solutions. Moreover, this situation is stressed by the need to deliver Air-Conditioning systems (A/C System) that satisfy market diversity without compromising cost and quality, regarding the split of market in multiple A/C system versions, such as several refrigerants (R134a, R744 . . . ), several power-trains like Internal Conventional Engine (ICE), micro-Hybrid vehicle (µHV), Hybrid vehicle (HV), full electrical vehicle (EV) and different comfort levels (multi-zoning, front/rear comfort) on a same platform of vehicle. Then, the challenge is to provide the market with a new concept that combines this modularity, flexibility and new standards to keep competitiveness despite market diversity.

The invention improves the situation.

In order to do so, the invention offers a heating and air conditioning device for an automotive vehicle, comprising a refrigerant circuit in which a refrigerant circulates in a single direction in both a cooling mode and in a heating mode, said refrigerant circuit comprising three distinctive units exchanging with respective secondary liquid loop(s), in which:
  a evaporating unit is dedicated to the evaporation of the refrigerant when operating in the cooling mode, called evaporating unit,
  a cooling unit is dedicated to the cooling or condensation of the refrigerant when operating in the cooling mode as well as operating in the heating mode, called cooling unit,
  a reversible unit dedicated to the evaporation of the refrigerant when operating in the heating mode and dedicated to the cooling or condensation of the refrigerant when operating in the cooling mode, called reversible unit.

This device is particularly advantageous because it allows the heating and air conditioning device to become the heart of the heating and cooling generation within the vehicle. The use of secondary loops allows rendering to the vehicle a global heat transfer unit with high flexibility and modularity, where all local exchanges may be connected for better performance.

An appropriate use of secondary loops allow for reduced energy wastes, and higher coefficient of performance (COP). If secondary loops are only used as a "go between" thermal transfer devices, it decreases the efficiency of the overall cooling & heating generation system by introducing an additional temperature gap to perform thermal exchanges on both cold and hot side. In this invention, secondary loops are used as a leverage to implement new functions. All these additional functions balance the basic drawbacks of secondary loops in order to improve the overall efficiency of the A/C system.

Also, the use of secondary loops is more appropriated because new refrigerants such as $CO_2$ are not easily transportable within the vehicle because of high operating pressure. Consequently, it requires a confinement of the refrigerant fluid in a pack as small as possible and with as less as possible connection with external media, avoiding any leakage. It gives also the opportunity to use some alternative refrigerants, which may be damned from circuiting in car cabin because of potential inflammability or toxicity, such as R152a for example.

In other embodiments, the invention may comprise the following features:
  the refrigerant circulates with the refrigerant circuit in a single direction in both the cooling mode and the heating mode;
  it may further comprise a first by-pass valve downstream of the reversible unit and upstream of the evaporating unit, and a second by-pass valve upstream of the reversible unit and downstream of the cooling unit, for switching between the heating mode and the cooling mode;
  it may further comprise a first expansion device downstream of the reversible unit and upstream of the evaporating unit, and a second expansion device upstream of the reversible unit and downstream of the cooling unit;
  in the heating mode, the first by-pass valve may by-pass the first expansion device and direct the refrigerant directly to the first evaporating unit. In this case, the first by-pass valve is parallel to the first expansion device, having its inlet connected to the inlet of this first expansion device and its outlet connected to the outlet of said first expansion device. In a second alternative, the first by-pass valve may by-pass the first expansion device and directs the refrigerant directly to the separator by locating the inlet of the first by-pass valve between the outlet of an internal heat exchanger and the inlet of the first expansion device while connecting the outlet of said first by-pass valve to the separator, using the same separator inlet the evaporator unit is using or using a dedicated separator inlet. In a third alternative, this first by-pass valve is connecting directly the outlet of the reversible unit to the inlet of the compressor, without flowing through the internal heat exchanger. The second by-pass valve is closed to force the refrigerant to the second expansion device;

in the cooling mode the first by-pass valve is closed to force the refrigerant to the first expansion device, and the second by-pass valve directs the refrigerant to the reversible unit;

the by-pass valves are controlled in an inverse or opposite manner;

the evaporating unit comprises at least one evaporator. For example, two evaporators may be used when adding an ejector to improve the A/C system performance. In the case the invention uses an ejector, the by-pass valve is operating in heating mode by allowing the refrigerant to flow through and is preferably located between internal heat exchanger and separator as described above because the pressure drop caused by the ejector must be avoided when operating the heating mode. In that mode the first expansion device may be avoided if the ejector is equipped with a variable orifice section, or variable throttle nozzle. It is understood that by canceling this first expansion device, the part of the refrigerant circuit between the reversible unit outlet and the evaporating unit inlet is free from any restriction. The meaning of restriction is any device whose dedicated function is to create a pressure drop to ensure expansion of the refrigerant to decrease its temperature;

If the ejector is equipped with a fixed orifice, this first expansion device could be maintained to increase the performance of the ejector in all functional points of the A/C system;

the reversible unit comprises at least one heat exchanger; In an alternative, two exchangers working at different temperature levels are used to improve overall thermal efficiency;

the evaporating unit has a secondary loop connectable to the cabin of the vehicle;

the cooling unit has a secondary loop with at least two branches, the first branch being connectable to the cabin, and the second branch being connectable to the front end of the vehicle;

the reversible unit has a secondary loop with one or two branches, according the number of exchangers;

it further comprises a compressor, most preferably an electrical compressor, and a separator along the refrigerant circuit between the evaporating unit and the cooling unit; it comprises an internal heat exchanger downstream of the reversible unit and separator, and upstream of the compressor and the first by-pass valve or the evaporator unit if the first by-pass valve is used in the second or third alternative;

it is made as a compact unit to decrease the packaging and mass of the refrigerant lines.

Other features and advantages of the invention will appear more readily from the following description, given by means of illustration only, of examples taken from the drawings on which.

The drawings and the following description essentially comprise elements having a defining character. Thus, they may serve to enhance the comprehension of the invention, but also to help defining it, as the case may be.

Figure 1:
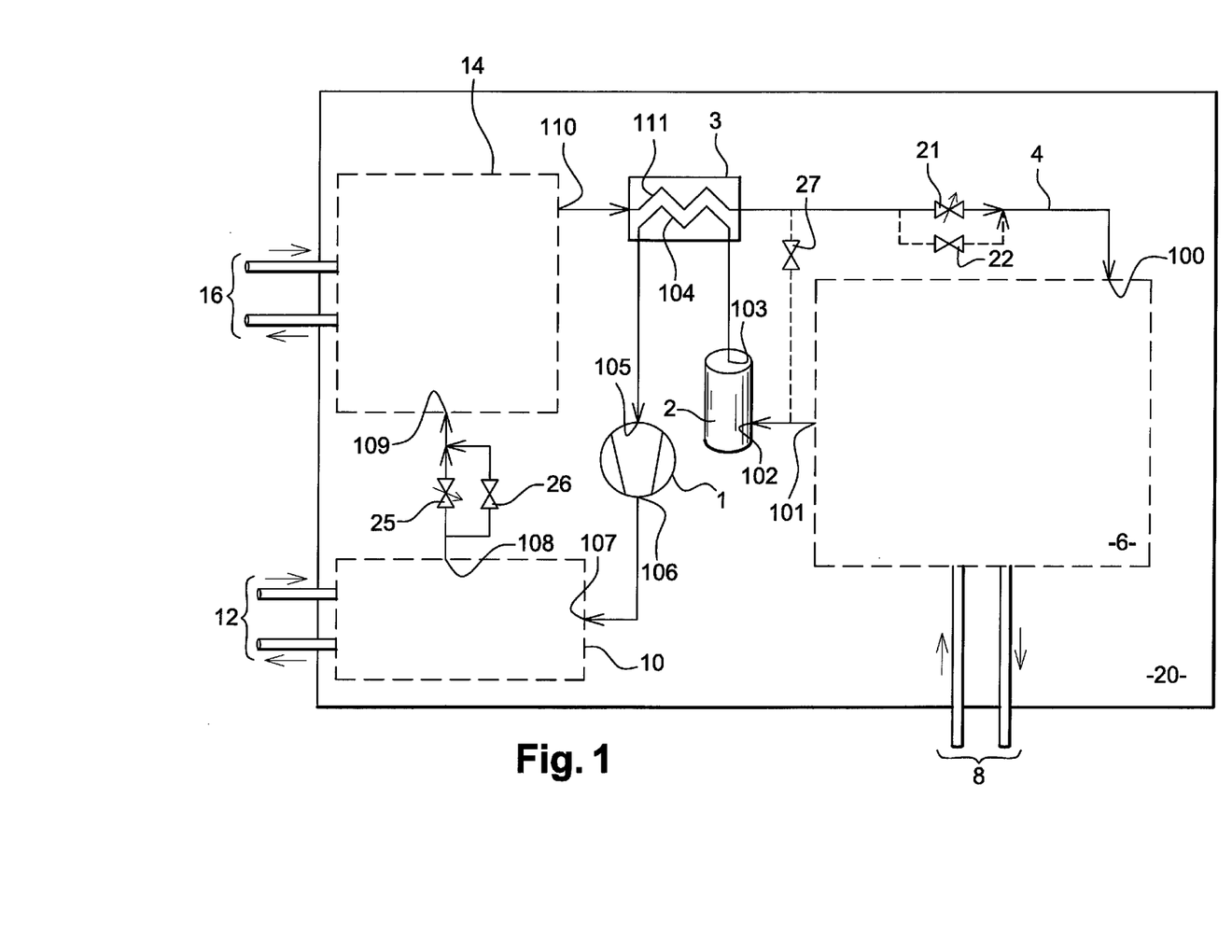
FIG. 1 shows a general overview of a heating and air conditioning device according to the invention. This figure shows the two first alternative locations of the first by-pass valve.

FIG. 1 shows a general principle view of the heating and air conditioning device according to the invention. In this figure, only the heat exchangers are outlined for the sake of simplicity. All further technical elements necessary to a complete thermodynamic cycle will be detailed with the embodiments.

The heating and air conditioning device 20 comprises a circuit 4 for circulation of a refrigerant. The refrigerant maybe of several types, such as R143a, $CO_2$, R152a, 1234 YF or any other suitable fluid of the like.

Certain fluids are inflammable or need to operate at a high pressure. As a result, it is interesting to keep them in a sealed closed loop but within a very small and compact package, leading to short refrigerant lines in order to limit all risks of refrigerant leakage, and improve both system reliability and maintenance.

The refrigerant circulates between an evaporating unit 6, which exchanges heat with a secondary loop 8, a cooling unit 10, which exchanges heat with a secondary loop 12, and a reversible unit 14, which exchanges heat with a secondary loop 16.

As will appear more readily from the following, the evaporating unit 6 forms a evaporating unit dedicated to the evaporation of the refrigerant when operating in the cooling mode, the cooling unit 10 forms a cooling unit dedicated to the cooling of the refrigerant when operating in the cooling mode as well as operating in the heating mode, and the reversible unit 14 forms a reversible unit dedicated to the evaporation of the refrigerant when operating in the heating mode and dedicated to the cooling of the refrigerant when operating in the cooling mode.

The fluids used in the secondary loops are generally referred to as "water". However, those fluids are typically a mix of water with glycol, in order to prevent freezing. Any type of heat transfer fluid may be used in secondary loops, and each secondary loop may have its particular fluid, that is to say mixed between water and glycol according different levels. In following description, the fluid from secondary loops will be called coolant.

In the evaporating unit 6, the refrigerant is heated and the coolant circulating in a cold secondary loop 8 is cooled down.

As a result, the coolant circulating in secondary loop 8 is used to provide cold energy to the air of the cabin of the vehicle.

Typically, the evaporating unit 6 comprises at least one evaporator. The evaporator unit 6 is connected to the circuit 4 via an inlet 100 while an outlet 101 of such evaporating unit 6 is connected to an inlet 102 of a separator 2. A separator outlet 103 is connected to a low pressure circuit 104 of the internal heat exchanger 3. This low pressure circuit 104 is then connected to a compressor inlet 105. A compressor outlet 106 is connected to an inlet 107 of a cooling unit 10.

In the cooling unit 10, the refrigerant is cooled down while the coolant circulating in a hot secondary loop 12 is heated. The cooling unit 10 has an outlet 108 connected to the second expansion device 25.

As a result, the coolant circulating in secondary loop 12 is used to provide hot calories or energy to the air that is pushed in the cabin of the vehicle or to provide a heat exchange coolant at a high temperature somewhere else in the vehicle.

Typically, the cooling unit 10 comprises at least one heat exchanger, working as condenser or gas cooler when used with carbon dioxide as refrigerant.

The circuit 4 also comprises the second expansion device 25 that makes the link between the cooling unit 10 and a reversible unit 14. This expansion device may be an electronic controllable expansion valve, a thermostatic valve or an orifice tube. A second by-pass valve 26 is in parallel to the second expansion device 25, having its inlet connected to the inlet of the second expansion device 25 and its outlet connected to the outlet of this second expansion device 25.

In the reversible unit 14, the situation is different. The reversible unit 14 is a heat exchanger which may function either as a gas cooler or condenser, or as an evaporator. The advantages of this reversibility will appear readily from the following.

As a result, the refrigerant may be either cooled or heated in the reversible unit 14, and the coolant in a reversible secondary loop 16 may be used to cool or heat another part of the vehicle.

The reversible unit 14 comprise an inlet 109 connected to the outlet of the second expansion device 25. It has also an outlet 110 that is connected to a high pressure circuit 111 of the internal heat exchanger 3. The outlet of this high pressure circuit 111 is then connected to the first expansion device 21, building a closed circuit loop 4.

Typically, reversible unit 14 comprises at least two heat exchangers, which allow better flexibility between the gas cooling or condensation mode (AC mode) and the evaporating mode (HP mode). However, a single heat exchanger could be used, or more than two, depending on the specific cases.

As will be apparent from the following, the heating and air conditioning device 20 is operating in two modes comprising:
  a cooling mode (or summer mode, or AC mode), in which the cooling unit 10 and the reversible unit 14 cools down or condensates the refrigerant, while the evaporating unit 6 evaporates or heats up the refrigerant;
  a heating mode (or winter mode, or HP mode), in which the evaporating unit 6 is bypassed or not used, the cooling unit 10 cools down or condensates the refrigerant, while the reversible unit 14 is used to heat up or evaporate the refrigerant.

In both modes, the refrigerant circulates in circuit (4) in the same direction, by means of the by-passes. All These functionalities offer high design flexibility.

In this example, the refrigerant is $CO_2$, and all the complementary elements described in this embodiment are specific to the $CO_2$ application. Other elements may be used and/or added when another refrigerant is used.

Figure 2:
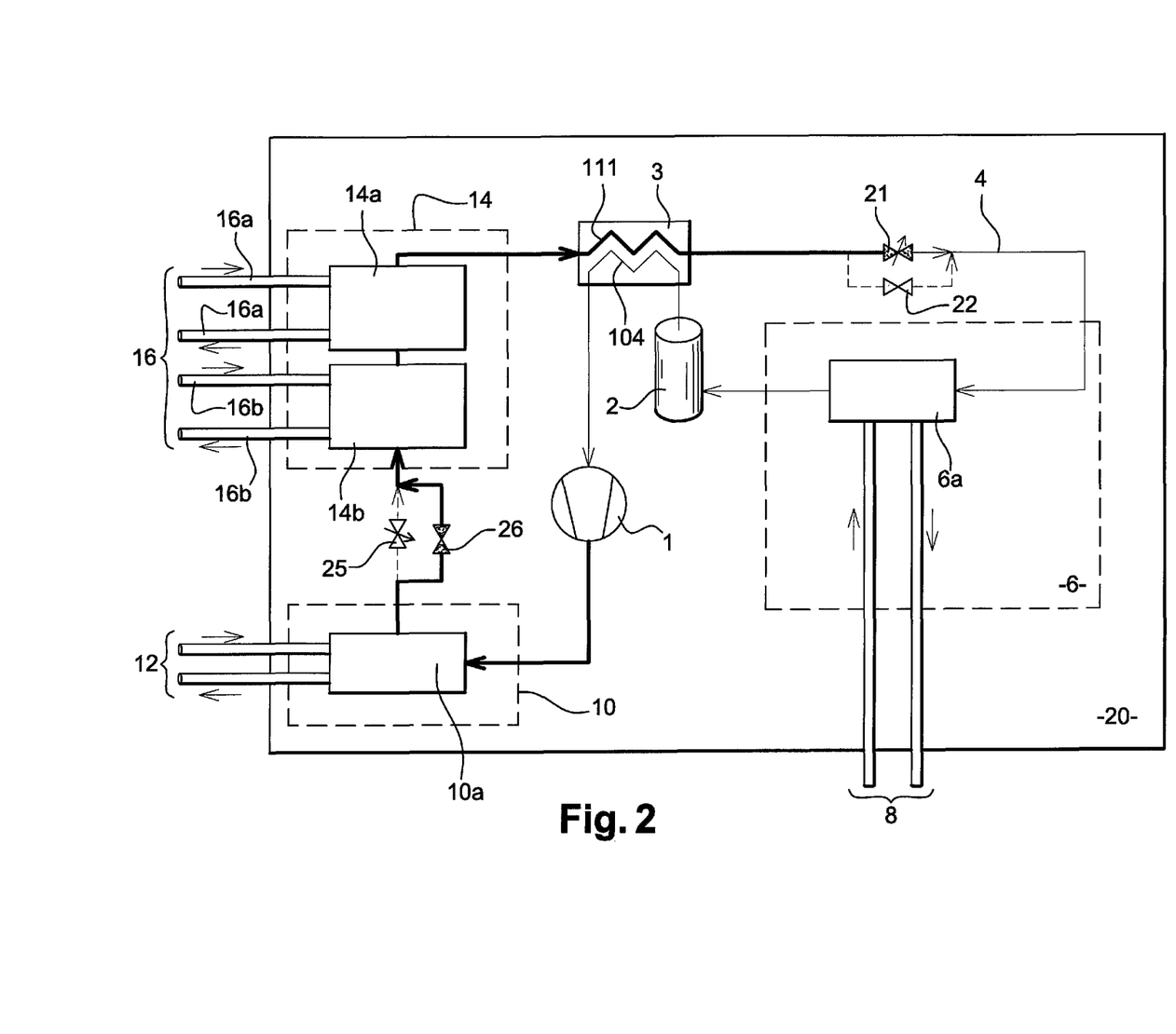
FIG. 2 shows the cooling operating mode (called AC mode) of the heating and air conditioning device according to the invention.

FIG. 2 is using a single evaporator 6a in the evaporating unit 6 and two exchangers 14a and 14b in the reversible unit 14, and the first expansion device 21 operates in order to create the pressure drop necessary to get cold energy at the evaporator 6a. This evaporator 6a is not crossed by air, like classical evaporator, but is exchanging cold energy between the refrigerant and the coolant of the cold coolant loop 8. This cold energy can then be distributed elsewhere in the vehicle when necessary.

FIG. 2 shows another secondary loop or hot coolant loop 12 connected to a water gas pre-cooler 10a being part of the cooling unit 10. The aim of such water gas pre-cooler 10a is to exchange with the coolant circulating in the hot coolant loop 12 at high temperature in order to discharge the very hot energy to an exchanger connected to this hot coolant loop and located in the front end of the vehicle to discharge this hot energy to the external air. This hot coolant loop 12 is also connected to a water heat exchanger located within the car cabin, this water heat exchanger being used mainly in the heating mode.

The reversible secondary loop 16 has two distinctive loops 16a and 16b. First loop 16a is connected to a water sub-cooler 14a of reversible unit 14 while the second loop 16b is connected to a water gas cooler 14b of reversible unit 14.

One benefit of using two water exchangers is to operate with two stages cooling or heating temperature levels, using two secondary loops at different temperature levels. By the way it is possible to improve the efficiency of the thermodynamic cycle by valorizing external sources at different temperatures.

However, reversible unit 14 may comprise a single heat exchanger or more, according refrigerant properties and packaging constraints, or if particular applications make it necessary.

At the outlets of these heat exchangers 14a and 14b, first and second loops 16a and 16b are coupled with heat exchanger which is cold down by external air of the vehicle.

FIG. 2 illustrates the AC mode with a three stage cooling effect, namely done by the water gas pre-cooler 10a first, the water gas cooler 14b and finally the water sub-cooler 14a. With refrigerant like carbon dioxide, the split between these three water gas coolers ensures to use efficiently the highest cooling capacity than can be given by the front end of the vehicle. For example, the pre-gas cooler exchanges between water at 90° C. while the refrigerant is around 165° C. at inlet, the gas cooler exchanges with water at 60° C. with a refrigerant temperature around 120° C. at inlet, and the sub-cooler with water closed to ambient temperature that exchanges with refrigerant temperature around 70° C. at inlet.

The refrigerant flows then in the high pressure circuit 111 of the internal heat exchanger 3. The first expansion device 21 is operating while the first by-pass valve 22 is fully closed.

In internal heat exchanger 3, the refrigerant thus exchanges heat with itself between the high pressure circuit 111 and the low pressure circuit 104, the high pressure circuit 111 in the internal heat exchanger 3 starting with an inlet connected to the outlet of reversible unit 14, and ending with an outlet connected to the inlet of the first expansion device 21, as mentioned above.

Internal heat exchanger 3 is particular to this embodiment and may be removed or complemented by another heat exchanger according the refrigerant properties. Internal heat exchanger 3 enables better efficiency for the refrigerant cycle.

The outlet of compressor 1 is connected to the inlet of cooling unit 10. In this embodiment, cooling unit 10 comprises a single water gas cooler or water condenser, which may be complemented with other gas coolers or condensers if need be.

The outlet of cooling unit 10 is connected to both the inlet of the second by-pass valve 26 and the inlet of the second expansion device 25.

To summarize, in cooling mode, the evaporating area is done by the evaporator 6a while the condensing or cooling area is done by both the cooling unit and the reversible unit, all three exchanger 10a, 14a and 14b being part of the process of cooling the refrigerant.

Figure 3:
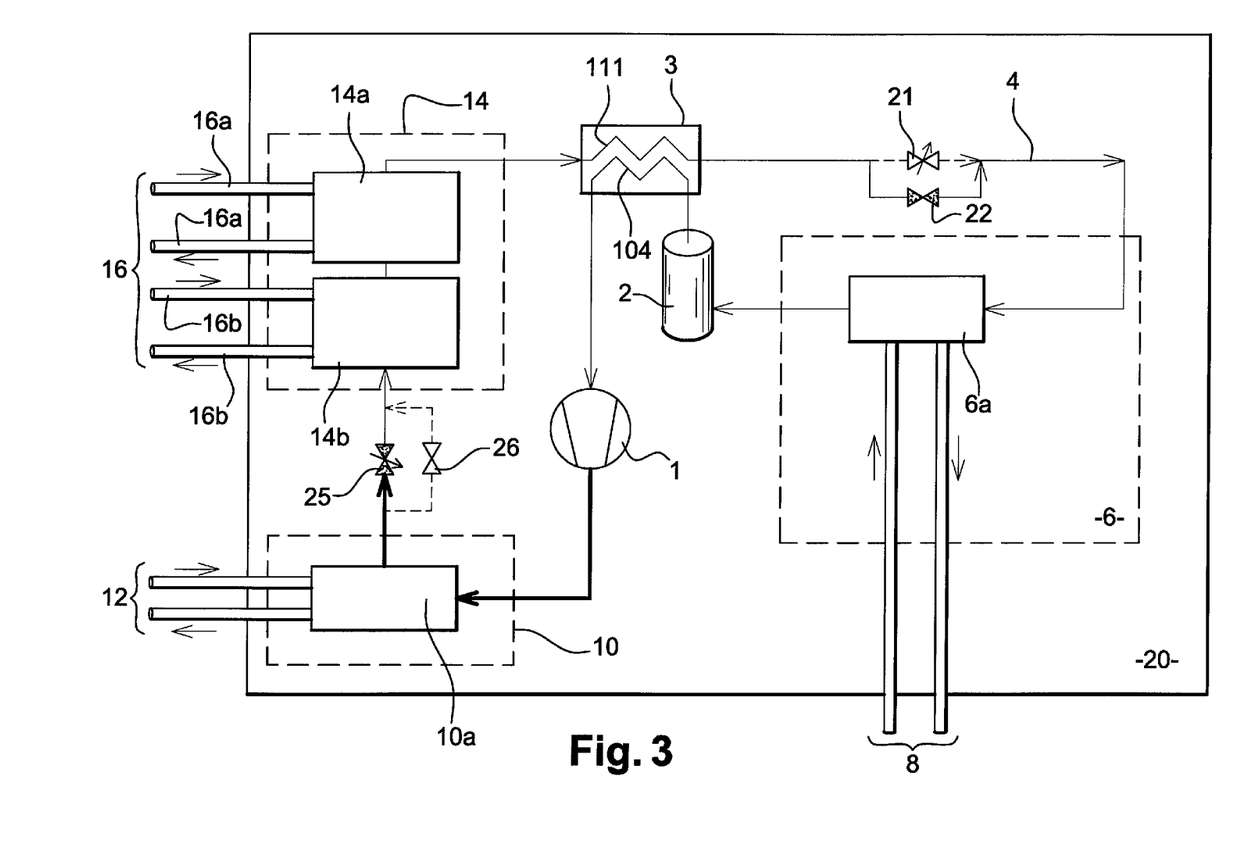
FIG. 3 shows the heating operating mode (called HP mode) of the heating and air conditioning device according to the invention.

FIG. 3 illustrates the heating mode according to the invention. The differences are in the way of managing the first and second by-pass valves 22 and 26.

The first by-pass valve 22 is open while the first expansion device 21 is closed allowing the refrigerant to enter the evaporating unit without any pressure loss. The refrigerant flows then in the separator 2, across the low pressure circuit 104 of the internal heat exchanger and to the compressor.

The electrical compressor 1 compresses the refrigerant and increases its temperature. The water gas cooler 10a of the cooling circuit is able to transfer its hot energy to the hot coolant loop 12, the latest being connected with at least one heat exchanger or radiator located within the car cabin in order to ensure the heating of the ambiance.

The second by-pass valve 26 is closed while the second expansion device 25 is operating and creating a pressure drop. In that case, the water heat exchangers 14a and 14b acts as evaporator and transfer their cold energy to the reversible coolant loop 16. This cold energy is then discharge within the external air in the front module of the car.

The advantage of having two stages of evaporation using the first heat exchanger 14a as well as the second heat exchanger 14b of the reversible unit 14 is to better manage de-icing by operating alternatively one or the other water heat exchanger. This is done by opening or closing the respective coolant loop 16a or 16b.

In brief, when the invention is operating as heating mode, the evaporating area is constituted of the reversible unit 14, namely by both the water heat exchanger 14a and 14b, as well as the evaporator 6a located within the evaporator unit 6 while the condensation or cooling area is done by the cooling unit 10, in particular by the water gas cooler 10a.

The advantage of keeping the circulation through the evaporator unit 6 is to ensure a smooth switch from cooling mode to heating mode providing a constant load in the circuit.

Figure 4:
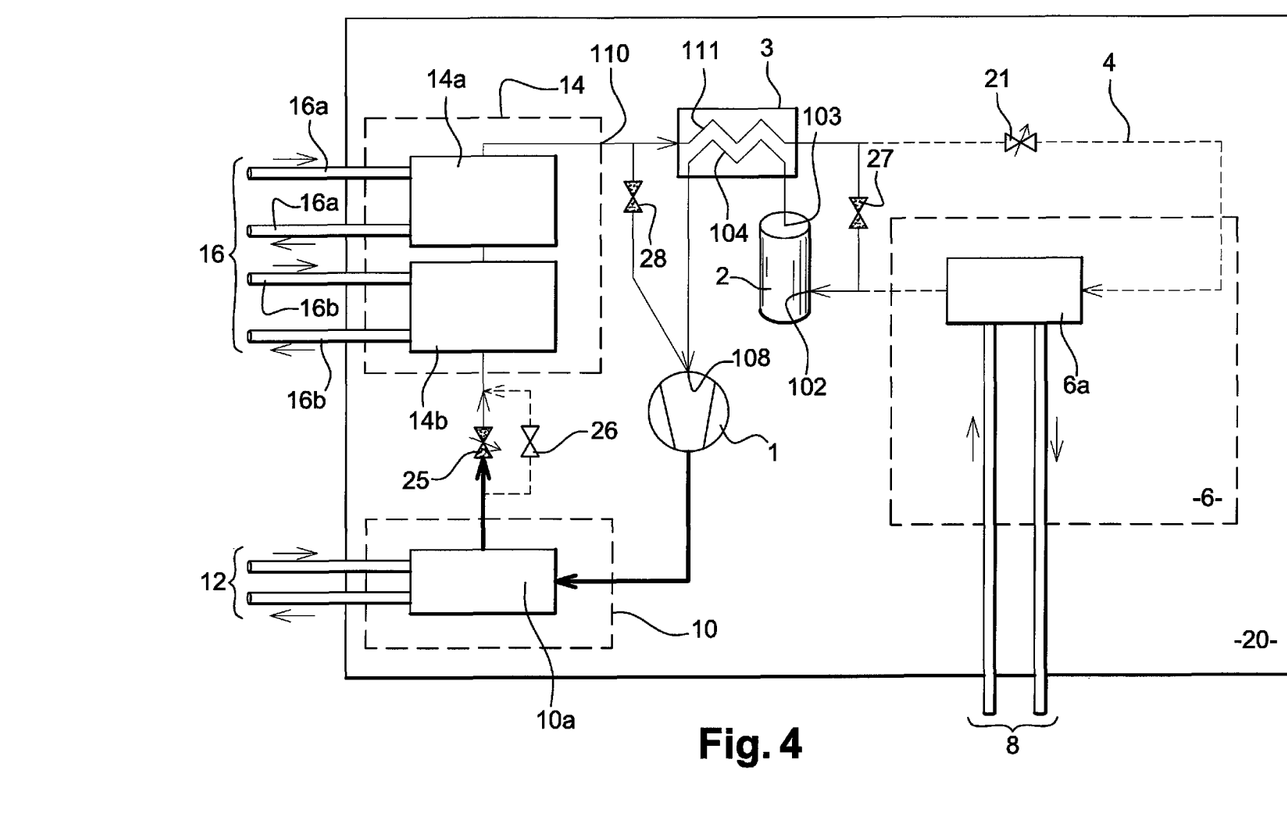
FIG. 4 shows a second embodiment of the heating and air conditioning device according to the invention using the second alternative location of the first valve.

FIG. 4 is similar to the heating mode shown on FIG. 3 except that it show the second and the third alternative of location for the first by-pass valve. In the second alternative, reference 27 illustrates the first by-pass valve that provides a direct link between the outlet of the high pressure circuit 111 of the internal heat exchanger and the separator inlet 102. Pipe coming from the first by-pass valve 27 and pipe coming from the evaporator unit 6 are merging in a single inlet 102 of the separator.

The advantage of the location of the first by-pass valve according to the second alternative is to decrease the pressure of the refrigerant flowing in the circuit 4.

The first by-pass valve 27 has an inlet coupled to the outlet of internal heat exchanger 3 (the high pressure circuit 111), and the outlet coupled to the inlet 102 of the separator 2.

This way, the first by-pass valve 27 is used to switch between the cooling mode and the heating mode:
  in the cooling mode, the first by-pass valve 27 is closed, forcing the refrigerant to the inlet of the first expansion device 21, such that reversible unit 14 is operating at high pressure as a gas cooler or condenser; and
  in the heating mode, the first by-pass valve 27 is fully opened, offering bypass of the first expansion device 21, and directs the refrigerant directly to the inlet of separator 2 and therefore to the compressor, such that reversible unit 14 functions can operate at low pressure as an evaporator, thanks to the simultaneous use of the second expansion device 25.

In the third alternative, the first by-pass valve 28 is installed directly between the outlet 110 of the reversible unit 14 and the compressor inlet 108 instead of being located as the second alternative, that is to say after the internal heat exchanger 3 and directly linked to the inlet separator 102.

Figure 5:
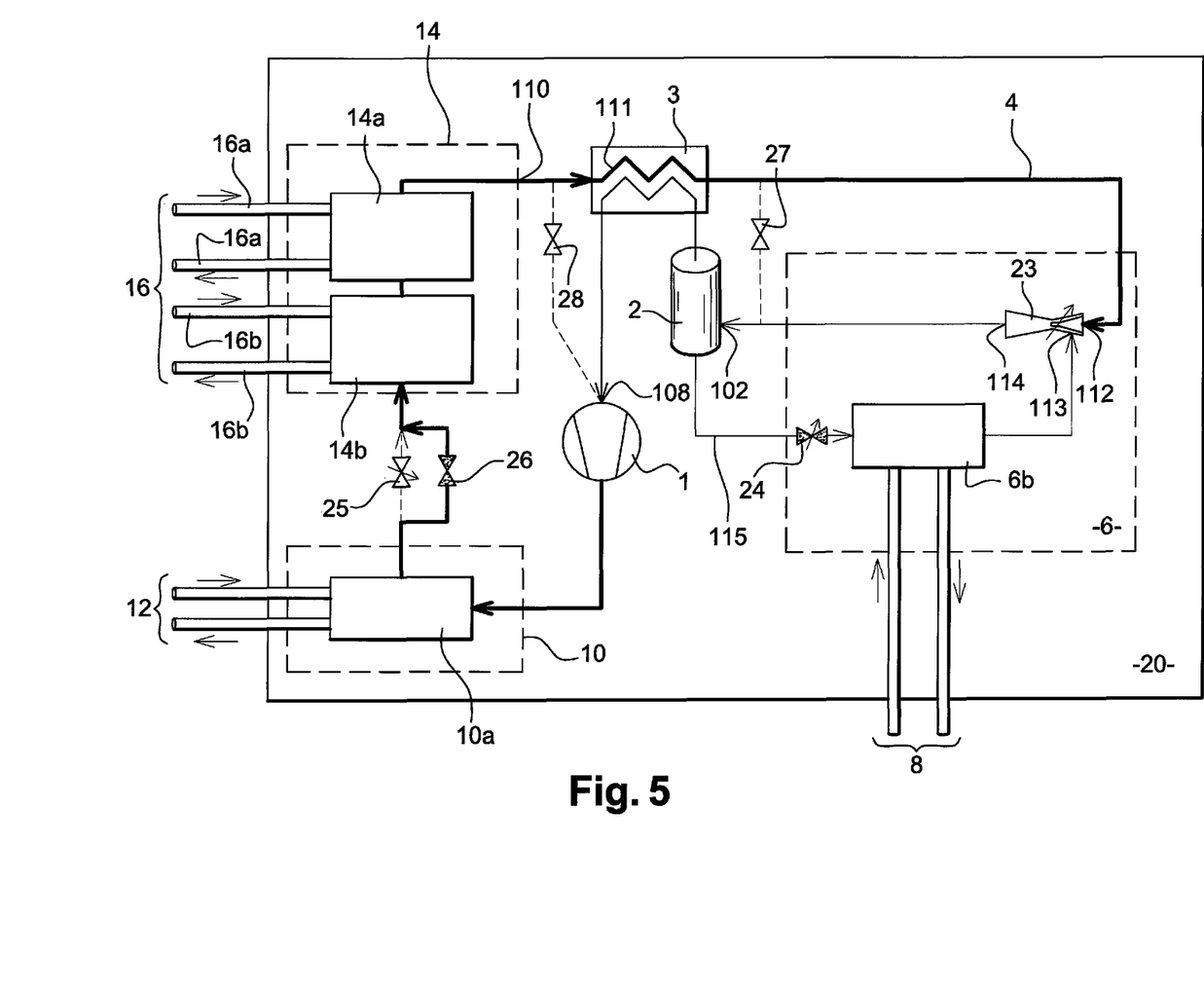
FIG. 5 shows a third embodiment of the heating and air conditioning device of FIG. 1.

FIG. 5 illustrates an embodiment where the evaporating unit 6 is equipped with an ejector 23, a single evaporator 6b and a third expansion device 24. This figure shows the cooling mode.

The ejector 23 has its main inlet 112 connected upstream to the high pressure circuit 111 of the internal heat exchanger 3. An auxiliary inlet 113 is connected to the outlet of the evaporator 6b. An ejector outlet 114 is connected to the separator inlet 102. A pipe 115 connected between le bottom area (where refrigerant at fluid state is present) of the separator 2 and the inlet of the evaporator 6b is supporting the third expansion device 24 that create the necessary pressure drop that create the cold energy within the water evaporator. According applications, the expansion valve 24 can be either a fixed orifice or a variable opening section valve.

In this case, the ejector 23 is creating an ejector cycle running through the evaporator 6b.

The ejector is equipped with a variable throttle nozzle. That is the reason why it can be connected upstream directly to the internal exchanger 3 without the need of having the first expansion device. According applications, the expansion valve 24 can be either a fixed orifice or a variable opening section valve. The advantage of having a variable throttle nozzle in the ejector is to be able to control the cooling capacity in a closed manner to the flow rate of refrigerant circulating in the circuit 4.

The proposed embodiment with ejector is to increase cooling capacity of the evaporating unit in a wide operating range with a same operating point of the compressor, leading to higher system efficiency and therefore the way to downsize components.

Figure 6:
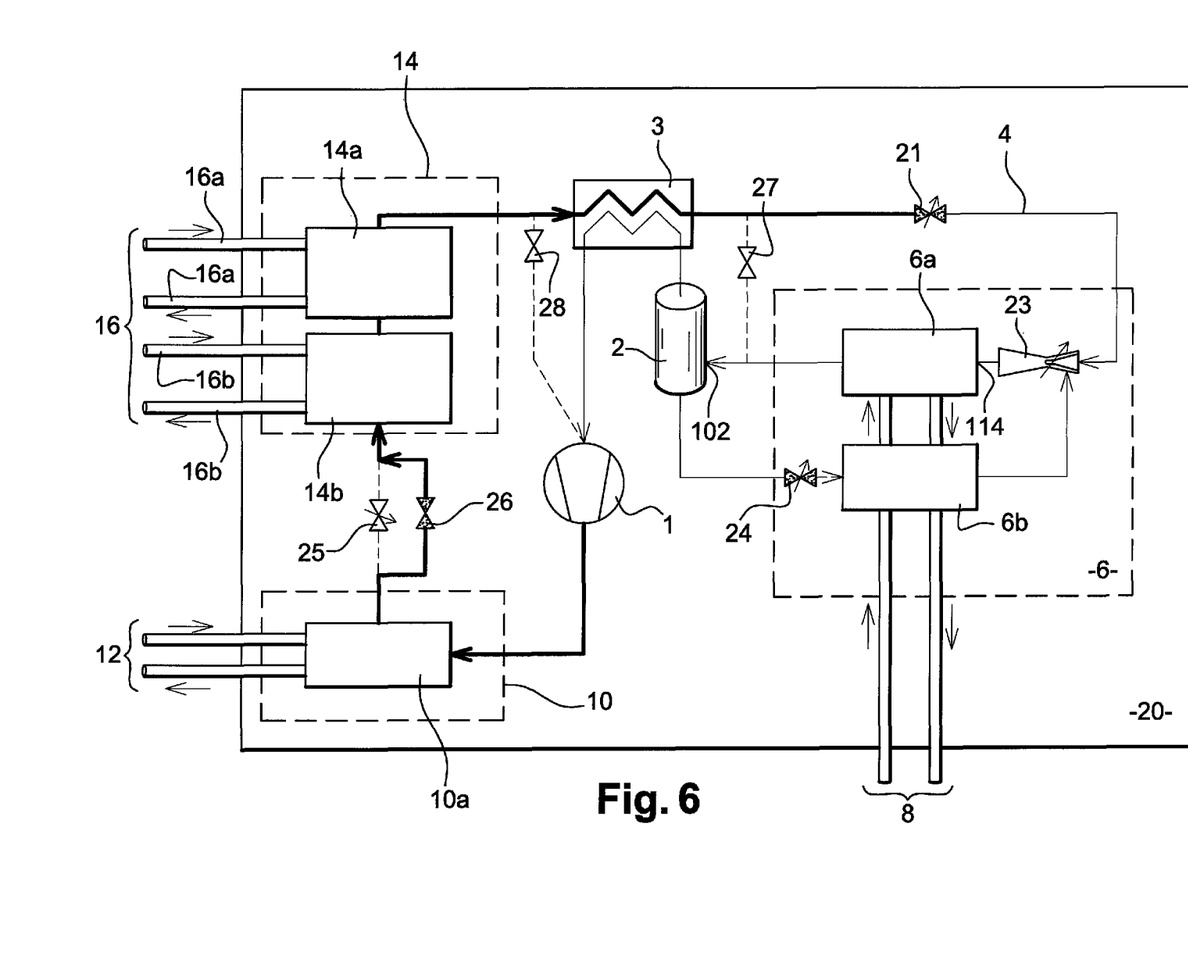
FIG. 6 shows a fourth embodiment of the heating and air conditioning device of FIG. 1, used in the cooling mode.

FIG. 6 shows the invention using one ejector 23 with a fixed nozzle and two evaporators 6a and 6b and one third expansion device 24. The use of a fixed nozzle in the ejector 23 requires the installation of the first expansion device 21 in order to adapt the pressure and the refrigerant flow rate at the maximum efficacy of the ejector. However, the two evaporators can be used with an ejector with a variable throttle nozzle like the one described on FIG. 5.

The difference with FIG. 5 is in the fact that there is a second evaporator 6a located within the evaporating unit 6 on the line between the ejector outlet 114 and the separator inlet 102. The two evaporators 6a and 6b are both connected to the cold coolant loop in parallel or in series and are both participating to the cooling transfer to the coolant that is circulating in the cold coolant loop 8. The efficiency is increased allowing decreasing the energy needed to perform or provide the same level of comfort.

FIG. 6 illustrates the heating and air conditioning according to the invention in a cooling mode, as in FIG. 2. The circulation of the refrigerant in the reversible unit 14 as well as in the cooling unit 10 is having the same function that is to say to cool the refrigerant going through the water heat exchangers 10a, 14a and 14b.

The first by-pass valve 27 is closed forcing the refrigerant to enter the evaporating unit 6 via the ejector 23. The latest is acting like an expansion device for the second evaporator 6a that is connected to the ejector outlet 114 as well as a pump for the first evaporator 6b. This allows having a flow rate within the first evaporator 6b and then providing cold energy to the coolant that is circulating within both evaporators 6a and 6b.

Figure 7:
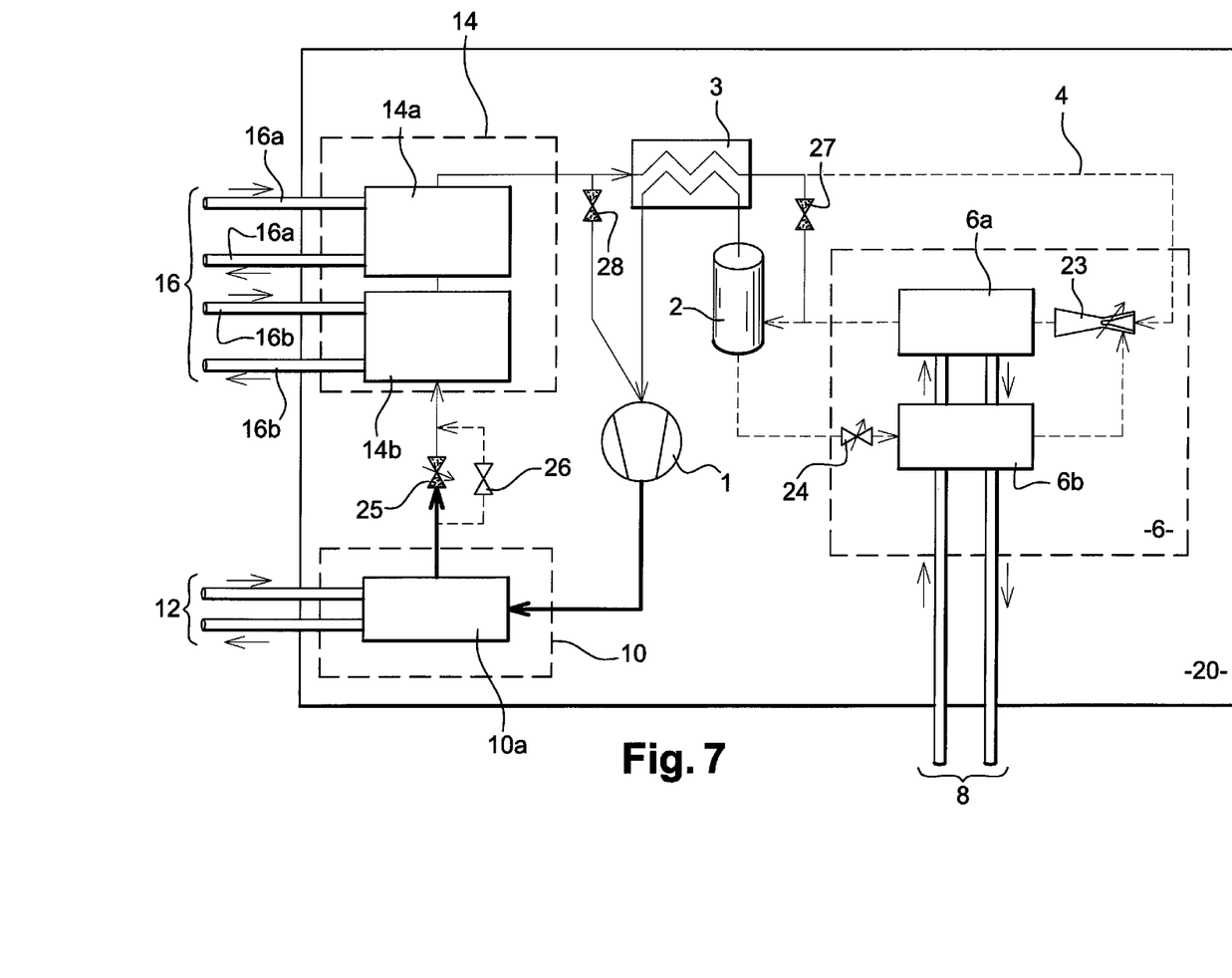
FIG. 7 shows the same structure as FIG. 7 but used in the heating mode.

FIG. 7 is identical in terms of structure to the one shown on FIG. 6, except that it functions in the heating mode. The first by-pass valve 27 is opened allowing the refrigerant to go directly in the separator 2. Thus, the evaporating unit 6 is fully by-passed. This solution has the advantage not only to bypass the first expansion device but also the ejector cycle. Indeed, it is better because it avoid that the ejector creates a pressure drop when operating in heating mode. The third alternative for location of the first by-pass valve 28 as described on FIG. 4 or 5 could also be used with the advantage to avoid the refrigerant to flow through the internal heat exchanger 3 as well as in the separator 2. The circuit in heating mode is more direct leading to better performance.

All the exchangers described in this invention are fluid-fluid type, more particularly coolant-refrigerant type (except for the internal heat exchanger 3 which is refrigerant-refrigerant). These exchangers are not crossed by air.

The two by-pass valves 26 and 22, 27 or 28 are controlled in an inverse manner so as to define the two mode of operating the circuit, making the compact unit a reversible device, both able to serve for cooling and heating purposes.

As in FIG. 4, the first by-pass valve 28 can be positioned in the device shown on FIGS. 5, 6 and 7 as proposed in the third alternative, that is to say replacing the first by-pass valve 27 located between internal heat exchanger 3 and separator inlet 102 by a direct fluid connection between the outlet 110 of the reversible unit 14 and the compressor inlet 108.

The heating and air conditioning device is finally a compact unit that comprises the following connected components: the evaporating unit 6, the cooling unit 10, the reversible unit 14, as well as the internal heat exchanger 3, the separator 2, the expansion devices 21, 25, 24, and the by-pass valves 22, 26, 27 and 28. As an option, the compressor may be incorporated in this compact unit. In order to support the compactness of this unit according to the invention, the length of the circuit making the link between the three distinctive units (evaporating, cooling and reversible) is less than 0.5 meter which corresponds to the maximum length where it is still interesting to bring together the three distinctive units in order to form an individual, or self supported or unitary unit.

The definition of downstream and upstream must be understood by comparing the way of circulation of the concerned fluid. By way of example, the first by-pass valve 21 is upstream the evaporating unit 6 means that the first by-pass valve in on the circuit 4 located and before the inlet of such evaporating unit.

Principles of representation in the FIGS. 1 to 7 are the following
- in doted lines when the refrigerant is not flowing through the concerned pipe,
- in full line when the refrigerant is flowing through the concerned pipe,
- arrow crossing element symbolises the variable aspect of such element,
- thin line (like for example reference 4 on FIG. 2) is the representation of the refrigerant at low pressure and low temperature,
- big line (like for example line between compressor 1 and the cooling unit 10 on FIG. 2) is the illustration of the refrigerant at high pressure and high temperature.

The invention claimed is:

1. A heating and air conditioning device (20) for an automotive vehicle, comprising a refrigerant circuit (4) in which a refrigerant circulates between three distinctive units (6), (10), (14) and exchanging heat with respective secondary liquid loops (8), (12), (16), said device comprising:
   an evaporating unit (6) dedicated to the evaporation of the refrigerant when operating in a cooling mode,
   a cooling unit (10) dedicated to the cooling or condensation of the refrigerant when operating in the cooling mode as well as operating in the heating mode, and
   a reversible unit (14) dedicated to the evaporation of the refrigerant when operating in the heating mode and dedicated to the cooling or condensation of the refrigerant when operating in the cooling mode,
   wherein the reversible unit (14) includes two water heat exchangers (14a, 14b) and the refrigerant within the reversible unit (14) exchanges heat with two distinctive loops (16a, 16b) operating at different temperature levels to provide two stage cooling or heating within the reversible unit (14).

2. A device according to claim 1, wherein the refrigerant circulates with the refrigerant circuit (4) in a single direction in both the cooling mode and the heating mode.

3. A device according to claim 1, further comprising a first by-pass valve (22) downstream of the reversible unit (14) and upstream of the evaporating unit (6), and a second by-pass valve (26) upstream of the reversible unit (14) and downstream of the cooling unit (10), for switching between the heating mode and the cooling mode.

4. A device according to claim 1, further comprising a first by-pass valve (27, 28) downstream of the reversible unit (14) and upstream of the cooling unit (10), and a second by-pass valve (26) upstream of the reversible unit (14) and downstream of the cooling unit (10), for switching between the heating mode and the cooling mode.

5. A device according to claim 3, further comprising a first expansion device (21) downstream of the reversible unit (14) and upstream of the evaporating unit (6), and a second expansion device (25) upstream of the reversible unit (14) and downstream of the cooling unit (10).

6. A device according to claim 5, wherein in the heating mode the first by-pass valve (22) is by-passing the first expansion device (21), and the second by-pass valve (26) directs the refrigerant to the second expansion device (25).

7. A device according to claim 5, wherein in the cooling mode the first by-pass valve (22) directs the refrigerant to the first expansion device (21), and the second by-pass valve (26) is by-passing the second expansion device (25).

8. A device according to claim 3, wherein the first by-pass valve (22, 27, 28) and the second by-pass valve (26) are controlled in an inverse manner.

9. A device according to claim 1, wherein the evaporating unit (6) comprises a single evaporator (6a).

10. A device according to claim 1, wherein the evaporating unit (6) comprises two evaporators (6a) and (6b).

11. A device according to claim 1, wherein the evaporating unit (6) comprises an ejector (23).

12. A device according to claim 11, wherein the ejector (23) is equipped with a variable throttle nozzle and wherein the circuit (4) between the reversible unit (14) and the evaporating unit (6) is free from any restriction.

13. A device according to claim 1, wherein the refrigerant circuit (4) and all connected components (6, 10, 14, 1, 2, 3, 21, 22, 25, 26, 27) are included in a compact unit, with a circuit length between each units (6, 10 14) less than 0.5 meter.

14. A device according to claim 2, further comprising a first by-pass valve (22) downstream of the reversible unit (14) and upstream of the evaporating unit (6), and a second by-pass valve (26) upstream of the reversible unit (14) and downstream of the cooling unit (10), for switching between the heating mode and the cooling mode.

15. A device according to claim 2, further comprising a first by-pass valve (27, 28) downstream of the reversible unit (14) and upstream of the cooling unit (10), and a second by-pass valve (26) upstream of the reversible unit (14) and downstream of the cooling unit (10), for switching between the heating mode and the cooling mode.

16. A device according to claim 2, further comprising a first expansion device (21) downstream of the reversible unit (14) and upstream of the evaporating unit (6), and a second expansion device (25) upstream of the reversible unit (14) and downstream of the cooling unit (10).

\* \* \* \* \*

UNITED STATES PATENT AND TRADEMARK OFFICE
CERTIFICATE OF CORRECTION

| | | |
|---|---|---|
| PATENT NO. | : 8,516,841 B2 | Page 1 of 1 |
| APPLICATION NO. | : 12/425621 | |
| DATED | : August 27, 2013 | |
| INVENTOR(S) | : Klaus Wittmann et al. | |

It is certified that error appears in the above-identified patent and that said Letters Patent is hereby corrected as shown below:

On the title page item (73), Assignee, after "Valeo", please delete "Systems" and replace with -- Systemes --

Signed and Sealed this
Eighth Day of July, 2014

Michelle K. Lee
*Deputy Director of the United States Patent and Trademark Office*